United States Patent
Fleming et al.

(10) Patent No.: US 6,315,812 B1
(45) Date of Patent: Nov. 13, 2001

(54) OXIDATIVE PRESSURE LEACH RECOVERY USING HALIDE IONS

(75) Inventors: Christopher A. Fleming, Omemee; David Dreisinger, Delta; P. Terry O'Kane, Coquitlam, all of (CA)

(73) Assignee: International PGM Technologies Ltd (CA)

( * ) Notice: Subject to any disclaimer, the term of this patent is extended or adjusted under 35 U.S.C. 154(b) by 0 days.

(21) Appl. No.: 09/300,878

(22) Filed: Apr. 28, 1999

Related U.S. Application Data

(63) Continuation-in-part of application No. 09/299,714, filed on Apr. 26, 1999, now abandoned, which is a continuation-in-part of application No. 09/298,337, filed on Apr. 23, 1999, now abandoned.

(51) Int. Cl.[7] .................................................. C22B 3/06
(52) U.S. Cl. .............................. 75/744; 423/22; 423/27
(58) Field of Search ............................ 75/744; 423/22, 423/27

(56) References Cited

U.S. PATENT DOCUMENTS

| | | | |
|---|---|---|---|
| 3,652,265 | * | 3/1972 | Marschik et al. . |
| 4,244,735 | * | 1/1981 | Reynolds et al. . |
| 4,266,972 | * | 5/1981 | Redondo-Abad et al. . |
| 4,378,275 | * | 3/1983 | Adamson et al. . |
| 4,423,011 | * | 12/1983 | Baglin et al. . |
| 5,114,687 | | 5/1992 | Han et al. ................. 423/32 |
| 5,292,490 | * | 3/1994 | Duyvesteyn et al. ........ 423/22 |
| 5,308,381 | | 5/1994 | Han et al. ................. 75/744 |
| 5,328,669 | * | 7/1994 | Han et al. ................. 423/32 |
| 5,431,788 | | 7/1995 | Jones ....................... 205/582 |
| 5,458,866 | * | 10/1995 | Simmons ................... 423/30 |
| 5,542,957 | * | 8/1996 | Han et al. ................. 75/732 |
| 5,620,585 | * | 4/1997 | Dadgar et al. . |
| 5,851,499 | * | 12/1998 | Gathje et al. .............. 423/23 |
| 5,874,055 | * | 2/1999 | Jones ....................... 423/24 |
| 5,989,311 | * | 11/1999 | Han et al. ................. 75/743 |

FOREIGN PATENT DOCUMENTS

2128597 * 5/1984 (GB) .

OTHER PUBLICATIONS

RU 2 079 561 C Nonferr Mining Metal Res Inst (Database WPI), May 20, 1997.
Derwent abstract of SU 1,766,994 A by As Sibe Inorg Chem Inst, published Oct. 7, 1992.*
English translation of Enis et al, RU 2,079,561, issued May 20, 1997.*
Gasparrini, Claudia. Gold and Other Precious Metals. Springer–Verlag:New York. 1993 p. 77.*
European Patent Office International Search Report PCT/CA99/01115 maildate:Nov, 26, 1999 11 pages.

\* cited by examiner

*Primary Examiner*—Roy King
*Assistant Examiner*—Tima McGurthy-Banks
(74) *Attorney, Agent, or Firm*—Thomas A. O Rourke; Wyatt Gerbert & O Rourke

(57) ABSTRACT

A method for recovering a precious metal from a host material, comprises the steps of subjecting the host material to an oxidative pressure leach process, in the presence of a halide ion constituent which is reactive with the precious metal, and at a temperature sufficient to cause at least a portion of the precious metal to be extracted by a leach solution; and recovering the precious metal from the leach solution.

41 Claims, 1 Drawing Sheet

OXIDATIVE PRESSURE LEACH RECOVERY USING HALIDE IONS

The present application is a continuation-in-part of 09/299,714, filed Apr. 26, 1999, now abandoned, which is a continuation-in-part of 09/298,337, filed Apr. 23, 1999, now abandoned.

BACKGROUND OF THE INVENTION

1. Field of the Invention

The present invention relates to methods for the recovery of precious metals from host materials, using pressure oxidation.

2. Description of the Related Art

Traditionally, gold is not included in the group of meals known as the platinum group metals which include platinum and palladium, rhodium, ruthenium, osmium and iridium. For the sake of brevity, the term 'precious metals' as used herein will refer to both gold and the platinum group metals. Typically, these precious metals are present in host materials along with other metals such as the base metals copper and nickel, in varying concentrations. These host materials are normally treated by grinding and flotation to produce a concentrate, which is then smelted. The constituent precious and base metals typically report to a matte phase during smelting. The matte phase is then processed by a variety of well established techniques to separate and recover the individual constituents in substantially pure form.

The matte typically undergoes oxidative pressure leaching at temperatures of 130 to 150 degrees Celsius which leaches the base metal component of the matte leaving the platinum group metals in the residue. After separating the solution from the residue, the residue is then typically leached, in atmospheric conditions, with concentrated hydrochloric acid and chlorine gas as the oxidant to dissolve the platinum group metals.

In certain cases, when the concentrations of valuable base metals (such as copper and nickel for example) are low, or when the concentrations of metals that are deleterious to smelting (such as arsenic or bismuth) are high, it is not economical to process the concentrates by smelting. In these instances, it can be advantageous to process the concentrate directly by a pressure leach process to leach the base metals.

Typically, the solid phase leaving the pressure leach step retains the precious metals while the copper and nickel transfer to the leach solution, for further processing by various hydrometallurgical procedures well known to the art. In this case, the precious metal constituent is recovered from the solid phase by relatively complex and expensive procedures, including leaching by chlorination or pressure cyanidation, followed by precious metal recovery by precipitation, solvent extractions and ion exchange techniques well known to the art. Though these processing routes may prove satisfactory in some cases, there are many host materials in which either the leach efficiency or the concentration of precious metals is insufficient for this relatively complex metallurgical flowsheet to be economically viable.

It is an object of the present invention to provide an improved technique for the recovery of precious metals.

SUMMARY OF THE INVENTION

Briefly stated, the invention provides a method for recovering a precious metal from a host material, comprising the steps of:

subjecting the host material to an oxidative pressure leach process, in the presence of a leach solution bearing a halide ion constituent which is reactive with the precious metal, and at a temperature sufficient to cause at least a portion of the precious metal to be extracted by said leach solution; and recovering the precious metal from the leach solution.

Preferably, the halide ion is selected from the group chloride, iodide or bromide. In this case, fluoride is not included because it is not sufficiently reactive with (or does not effectively complex with) gold and other precious metals.

Preferably, the halide ion originates from a halide salt which is added to the leach solution. Still more preferably, the halide ion is a chloride ion provided to the leach solution by a chloride salt. In this case, the chloride salt may include sodium chloride, calcium chloride or potassium chloride, as well as ferrous or ferric chloride, hydrochloric acid, cupric or cuprous chloride, lithium chloride, magnesium chloride and ammonium chloride, among still others.

Preferably, sufficient chloride salt constituent is present in solution to provide a chloride ion concentration ranging from about 0.5 g/L to about 100 g/L, more preferably from 1 to 20 g/L, still more preferably from 1.5 to 10 g/L. Still more preferably, the chloride ion constituent is present at a concentration ranging from about 3 to about 6 g/L. In one embodiment, the chloride salt is sodium chloride which itself is provided at a concentration of about 10 g/L.

In another aspect of the present invention, there is provided a method for recovering a precious metal from a host material, comprising the steps of:

placing the host material in a pressure leaching vessel;

subjecting the host material to an oxidative pressure leach process, in the presence of a halide ion constituent which is reactive with the precious metal, and at a temperature sufficient to cause at least a portion of the precious metal to be extracted by a leach solution; and recovering the precious metal from the leach solution.

Preferably, before recovering the precious metal from the leach solution, barren solid is separated from the leach solution, although it may be desirable in some cases to recover the precious metal from the leach solution before separating the barren solid, for example to minimize the loss of precious metals contained in the residual leach solution which can be lost with the separated barren solids.

In one embodiment, the oxidative pressure leach process takes place in the presence of a gaseous oxidant. Preferably, the gaseous oxidant is oxygen gas. The oxygen gas is preferably injected into the vessel at an oxygen partial pressure of between 1 and 500 psig, still more preferably between 10 and 200 psig and still more preferably between 50 and 100 psig. Other oxidants may also be effective including chlorine, the ferric ion, hydrogen peroxide and Caro's acid though these may not in some cases be as economical as oxygen gas.

Preferably, the temperature ranges from about 170 degrees Celsius to about 300 degrees Celsius, more preferably from about 195 degrees Celsius to about 275 degrees Celsius, more preferably from 200 degrees Celsius to 250 degrees Celsius, still more preferably from 210 degrees Celsius to about 230 degrees Celsius.

Preferably, the leach solution is acidic. Still more preferably, the acid constituent is sulphuric acid at a concentration ranging from 1 to 500 g/L. More preferably, the sulphuric acid is at a concentration ranging from about 5 to about 250 g/L, more preferably at a concentration ranging from about 10 to about 100 g/L.

It is important to maintain an elevated oxidation potential in solution during the leach (for example at levels greater than 500 mV versus Ag/AgCl) for maintaining precious metal leaching efficiencies in the process. This can be done by oxidizing, as completely as possible, any reduced species such as sulphide ions or sulphur in the feed to the process, for example. It may also be done by converting most of the ferrous ion in solution to ferric ion. In addition, a tramp ion constituent, which is added as a consequence of grinding or re-grinding the feed to the process, may also contribute to a reduction in the precious metal recovery. This is especially true in the case of gold.

The host material may be in any one of a number of forms, including a primary sulphide or oxide ore body which has been processed by grinding and the like, an ore concentrate, or a secondary material containing precious metals, such as for example a spent oxidation catalyst. The host may also be a matte material from a smelting operation which, in contrast to the ore concentrates, can have precious metal concentrations of up to 10 percent, with the balance being base metals and sulphide. In this case, it may be desirable either to recover the precious metals and base metals together into the leach solution or, alternatively, use a multiple step process to recover the base metals first and then the precious metals second. For example, in a first step, the base metals can be recovered to a first leach solution as in the prior art using concentrations of oxygen and suitable temperatures to obtain a first leach solution of base metals with residual amounts of sulphuric acid. The precious metals will be retained in the residue and may then be removed in a second phase at the conditions disclosed herein to recover the precious metals to a second leach solution.

The first phase may be carried out using just air or oxygen in the absence of a halide ion constituent to recover the base metal constituents as in the form of one or more sulphate complexes, such as copper(II)sulphate, nickel(II)sulphate and cobalt(II)sulphate. In this case, the oxidative leach autoclave of the first phase will likely be operating at relatively lower temperatures, than the oxidative leach process of the second phase which will have relatively higher temperature and be exposed to the halide ion constituent. Alternatively, the first phase may be carried out in the presence of a halide ion constituent at conditions as disclosed herein to recover the base and precious metal constituents simultaneously.

Thus, in yet another of its aspects, the present invention provides a method for recovering a precious metal from a smelt matte material, wherein said matte material includes a precious metal constituent and a base metal constituent, comprising the steps of:

subjecting said matte material to a first oxidative pressure leach process, with sufficient oxidant and at a selected temperature to recover substantially all of said base metal constituent in the form of at least one sulphate complex into a first leach solution; and then subjecting said host material to a second oxidative pressure leach process, in the presence of a halide ion constituent which is reactive with said precious metal, and at a temperature sufficient to cause at least a portion of said precious metal to be recovered into a second leach solution; and then recovering said precious metal from said leach solution.

Preferably, the first oxidative pressure leach process occurs at a temperature ranging from 100 to 190 degrees Celsius, more preferably from 120 to 170 degrees Celsius, still more preferably from 130 to 150 degrees Celsius.

In still another of its aspects, the present invention provides a method for recovering a precious metal from a smelt matte material, wherein said matte material includes a precious metal constituent and a base metal constituent, comprising the steps of:

subjecting said matte material to a single oxidative pressure leach process, in the presence of a halide ion constituent which is reactive with said precious metal constituent, and at a temperature sufficient to cause substantially all of said base metal and precious metal constituents to be recovered into a first leach solution; and recovering said base and precious metal constituents from said leach solution.

Preferably, the halide is chloride, though the other halides as disclosed herein are also contemplated.

In still another of its aspects, the invention provides a method for recovering a platinum group metal or gold from a host material, comprising the steps of:

subjecting the host material to an oxidative pressure leach process, in the presence of a leach solution bearing a halide ion constituent which is reactive with the platinum group metal or gold, and at a temperature sufficient to cause at least a portion of the platinum group metal or gold to be extracted by said leach solution; and recovering the platinum group metal or gold from the leach solution.

BRIEF DESCRIPTION OF THE DRAWINGS

Several preferred embodiments of the present invention will now be described, by way of example only, with reference to the appended drawing in which.

DESCRIPTION OF THE PREFERRED EMBODIMENTS

Figure 1:
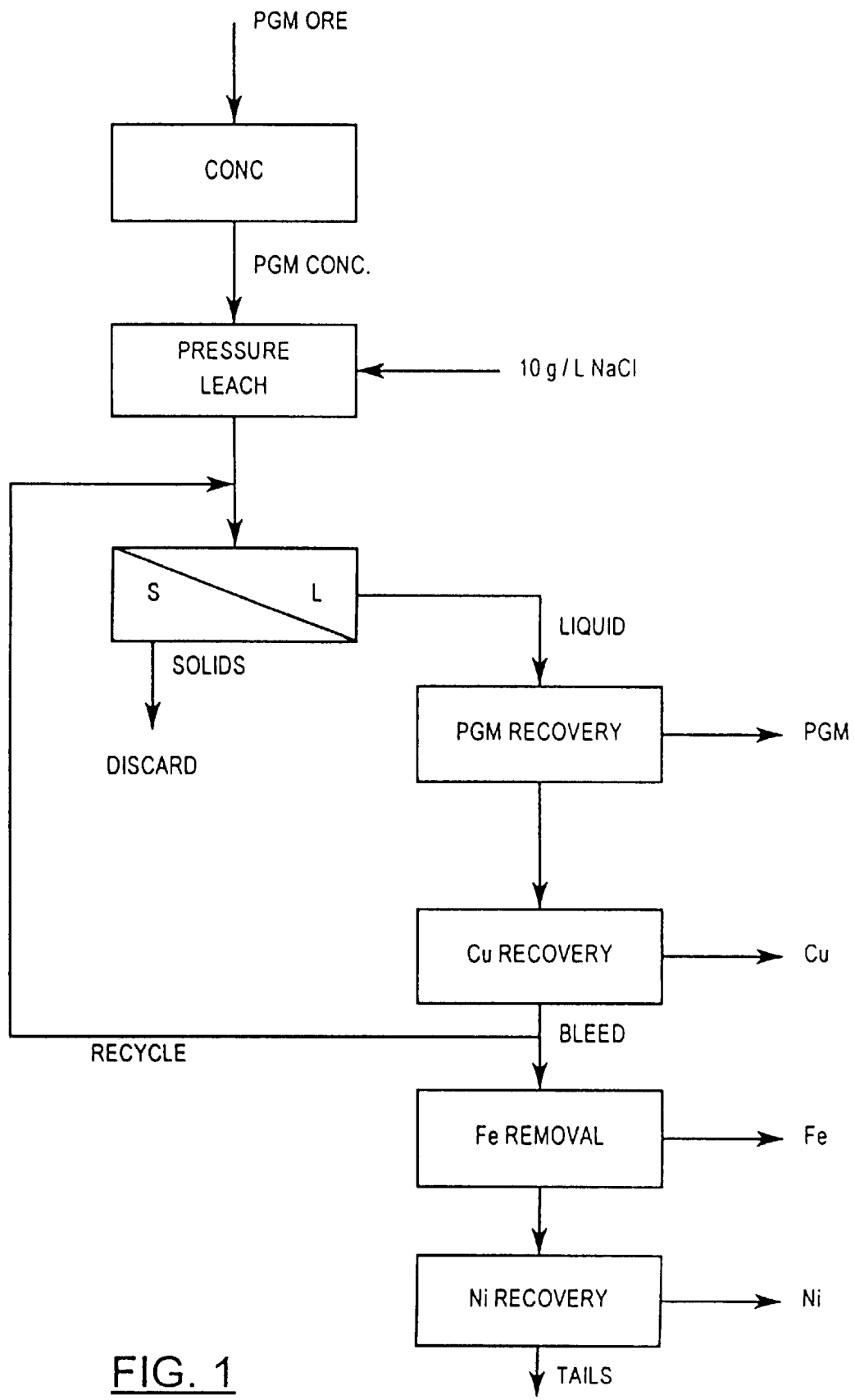
FIG. 1 is a schematic view of a method for recovering precious metals.

The present method is based, in part, on the discoveries that:

i) one or a number of the precious metals and base metals may be leached from a host material in a single oxidative pressure leach process, whose leach solution may be treated to recover the individual precious and base metals, as desired, and ii) this reaction can occur successfully with a relatively low concentration of halide ion in the leach solution, provided the selected halide ion is sufficiently reactive with the precious metals being recovered.

The present method involves the following steps:

i) subjecting the host material to an oxidative pressure leach process, in the presence of a leach solution bearing halide ion constituent which is reactive with the precious metal, and at a temperature sufficient to cause at least a portion of the precious metal to be extracted by the leach solution; and ii) recovering the precious metal from the leach solution.

In one embodiment, the host material is a sulphide ore body or ore concentrate. During pressure leaching in the presence of oxygen, the sulphide component of the host material is oxidized to sulphuric acid. In this case, the process takes place in an acidic environment ranging from 20 to 100 g/L sulphuric acid. In other words, the acid is produced during the reaction to solubilize the copper and nickel.

In one embodiment, the successful leach of precious metals and base metals from a host material occurs in the presence of an acid, in this case, sulphuric acid and at a temperature of at least 200 degrees Celsius. It is believed that the process may also function at temperatures below 200 degrees Celsius and to temperatures as high as economically achievable. It is also believed that the presence of acid in the leach solution has a desirable effect of increasing the overall recovery of precious metals from the host material. Thus, the temperature selected for the pressure leach reaction of the present process will depend on the mineralogical characteristics and particle size of the feed material, the concentration of precious metals in the feed material, the acid strength, the oxygen partial pressure and the residence time in the pressure leaching vessel.

When the halide ion is a chloride, the chloride salt may be preferably selected from sodium chloride, calcium chloride or potassium chloride. More preferably the salt is sodium chloride and is provided at a concentration ranging from about 1 g/L to about 100 g/L, still more preferably from 2 to 20 g/L, still more preferably from 5 to 15 g/L, still more preferably from 8 to 12 g/L. In one embodiment, the chloride salt is sodium chloride at a concentration of about 10 g/L in solution. The optimum concentration of the chloride ion will likely tend to be higher with increasing concentration of the precious metal being recovered.

In one embodiment, the oxidative pressure leach process takes place in the presence of a gaseous oxidant. Preferably, the gaseous oxidant is oxygen gas. The oxygen gas is preferably injected into the vessel at an oxygen partial pressure of between 1 and 500 psig, still more preferably between 10 and 200 psig and still more preferably between 50 and 100 psig.

Referring to FIG. 1, once the precious metals are in solution, a number of approaches can be selected to recover the precious metal constituent first, such as by the use of activated carbon adsorption or ion exchange resin adsorption, or reduction/precipitation with a mixture of sulphur dioxide and sodium hydrosulfide, as well as copper cementation. In the case of adsorption on activated carbon or ion exchange resins, the precious metals constituent can be recovered directly, if desired, from the acidic pulp phase prior to solid liquid separation, which may be advantageous in some circumstances.

While a number of ranges have been provided herein above for a chloride concentration, there may be, in some cases, other ranges that are suitable, given changes in the composition of the feed, particularly changes in the concentrations of the precious metals.

Embodiments of the present invention will be described with reference to the following examples which are presented for illustrative purposes only and are not intended to limit the scope of the invention.

EXAMPLES

Tests were conducted with 5 and 10 g/L NaCl added to the pressure leach solution for a precious metal-bearing ore flotation concentrate, including gold, platinum and palladium.

The results pertaining to gold, platinum and palladium are shown in table 1 for several tests under different conditions. It can be seen that 91 to 96 percent of the resident gold, 93 to 98 percent of the resident platinum and 94 to 96 percent of the resident palladium were successfully recovered into the leach solution, using different temperatures and concentrations of NaCl in solution. Recoveries of copper and nickel to the leach solution were over 94 percent in all the tests.

The efficacy of the process may be improved with an increase in surface area of the host material to the pressure leach solution and, desirably, the ore may be ground to 75% passing 75 microns or a concentrate may be re-ground to 75 percent passing 20 microns.

It can also be seen that the presence of a tramp ion constituent, as a consequence of grinding or re-grinding the feed to the process, appears to have contributed to a reduction in the precious metal recovery. This reduction can be seen in tests 3 to 5 whose samples were re-ground using steel ball media in comparison with tests 6 and 7 whose samples were re-ground using inert ceramic ball media.

However, it will also be seen that, in the case of experiment 5, essentially no precious metals were recovered from the concentrate wherein the temperature was 200 degrees Celsius, wherein the concentrate was re-ground, despite the presence of 10 g/L NaCl in solution. Therefore, temperature may, in some cases, have a significant influence on the successful recovery of precious metals using the present process.

In one test, the acidic leach solutions from tests 6 and 7 was combined and treated by a process to recover the precious metals into a precipitate. The leach solution was first reduced with sodium metabisulphite from a potential of 570 mV to 340 mV (versus Ag/AgCl). Sodium hydrogen sulphide was then added to the reduced leach solution at a concentration of 2.5 g/L NaHS. The results of this test are shown in table 2.

TABLE 1

| Test No | CONCENTRATE REGRIND | REGRIND MEDIA | LEACH TEMP (° C.) | NaCl ADDED (g/L) | ANALYZED | GOLD (g/l) | PLATINUM (g/l) | PALLADIUM (g/l) |
|---|---|---|---|---|---|---|---|---|
| 0 | | | | | FEED | 2.24 | 1.75 | 8.91 |
| 1 | NO | | 220 | 0 | RESIDUE | 3.32 | 1.97 | 5.44 |
| | | | | | EXTN, % | 7 | 29 | 61 |
| 2 | NO | | 220 | 10 | RESIDUE | 0.27 | 0.49 | 1.37 |
| | | | | | EXTN, % | 91 | 79 | 88 |
| 3 | YES | STEEL | 220 | 10 | RESIDUE | 0.74 | 0.18 | 0.47 |
| | | | | | EXTN, % | 79 | 93 | 96 |
| 4 | YES | STEEL | 220 | 5 | RESIDUE | 0.64 | 0.16 | 1.01 |
| | | | | | EXTN, % | 79 | 93 | 92 |
| 5 | YES | STEEL | 200 | 10 | RESIDUE | 2.71 | 1.97 | 10.9 |
| | | | | | EXTN, % | 0 | 4 | 0 |
| 6 | YES | CERAMIC | 220 | 10 | RESIDUE | 0.13 | 0.06 | 0.72 |
| | | | | | EXTN, % | 96 | 98 | 94 |
| 7 | YES | CERAMIC | 220 | 10 | RESIDUE | 0.13 | 0.06 | 0.64 |
| | | | | | EXTN, % | 96 | 98 | 95 |

Concentrate particle size: $k_{80}$ 32 microns
Reground concentrate: $k_{80}$ 15–20 microns
Oxygen partial pressure: 100 psi
Leach time: 2 hours.

TABLE 2

| SAMPLE | METAL CONCENTRATION (ppm UNLESS STATED OTHERWISE) | | | | | |
|---|---|---|---|---|---|---|
| | Cu | Ni | Fe | Au | Pt | Pd |
| LEACH SOLUTION | 15200 | 18500 | 1500 | 0.32 | 0.24 | 1.23 |
| BARREN SOLUTION | 14300 | 18200 | 1340 | 0.01 | 0.00 | 0.01 |
| PRECIPITATE | 61.8% | 0.2% | 0.4% | 92 | 102 | 484 |

What is claimed is:

1. A method for recovering a precious metal from a host material, comprising the steps of:
   depositing the host material in an autoclave;
   depositing a chloride salt in the autoclave;
   subjecting said host material to an oxidative pressure leach process with a sulphuric acid leach solution, in the presence of the chloride salt, and at a temperature ranging from about 210 to about 230 degrees Celsius, said leach solution having an acid strength of at least 1 g/L, to form a precious metal-bearing chloride complex in the leach solution; and
   recovering said precious metal from the chloride complex.

2. A method as defined in claim 1 wherein said precious metal includes a platinum group metal or gold.

3. A method as defined in claim 1 wherein the chloride salt includes sodium chloride, calcium chloride or potassium chloride, ferrous chloride, ferric chloride, cupric chloride, cuprous chloride, lithium chloride and magnesium chloride.

4. A method as defined in claim 1 wherein the chloride salt provides a chloride ion which is present at a concentration ranging from about 0.5 g/L to about 100 g/L.

5. A method as defined in claim 4 wherein said chloride ion is present at a concentration ranging from 1 to 20 g/L.

6. A method as defined in claim 5 wherein said chloride ion is present at a concentration ranging from 1.5 to 10 g/L.

7. A method as defined in claim 6 wherein said chloride ion is present at a concentration ranging from about 3 to about 6 g/L.

8. A method for recovering a precious metal from a host material, comprising the steps of:
   subjecting said host material to an oxidative pressure leach process, in the presence of a chloride ion constituent in a sulfuric acid leach solution having a acid concentration greater than 1 g/L and which is reactive with said precious metal, and at a temperature ranging from about 170 degrees Celsius to about 300 degrees Celsius to cause at least a portion of said precious metal to be extracted by a leach solution to form a precious metal-bearing chloride complex; and
   recovering said precious metal from said complex.

9. A method as defined in claim 8 wherein said temperature ranges from about 195 degrees Celsius to about 275 degrees Celsius.

10. A method as defined in claim 9 wherein said temperature ranges from 200 degrees Celsius to 250 degrees Celsius.

11. A method as defined in claim 10 wherein said temperature ranges from 210 degrees Celsius to about 230 degrees Celsius.

12. A method as defined in claim 8 wherein said sulphuric acid is at a concentration ranging from 1 to 500 g/L.

13. A method as defined in claim 12 wherein said sulphuric acid is at a concentration ranging from about 5 to about 250 g/L.

14. A method as defined in claim 13 wherein said sulphuric acid is at a concentration ranging from about 10 to about 100 g/L.

15. A method as defined in claim 8 further comprising, before the recovering step, the step of separating barren solid residue from said leach solution.

16. A method for recovering a precious metal from a host material, comprising the steps of:
   placing said host material in a pressure leaching vessel;
   subjecting said host material to an oxidative pressure leach process using a sulphuric acid leach solution, in the presence of a chloride salt to provide a chloride ion which is reactive with said precious metal, and at a temperature ranging from 210 degrees Celsius to 230 degrees Celsius, to cause at least a portion of said precious metal to be extracted by a leach solution to form a precious metal-containing chloride complex in the leach solution while in the pressure leaching vessel; and
   recovering said precious metal from said complex.

17. A method as defined in claim 16 wherein said oxidative pressure leach process takes place in the presence of a gaseous oxidant.

18. A method as defined in claim 17 wherein said gaseous oxidant is oxygen gas.

19. A method as defined in claim 18 wherein said oxygen gas is injected into said vessel at an oxygen partial pressure of between 1 and 500 psig.

20. A method as defined in claim 19 wherein said oxygen partial pressure is between 10 and 200 psig.

21. A method as defined in claim 20 wherein said oxygen partial pressure is between 50 and 100 psig.

22. A method as defined in claim 16 wherein said host material is a processed ore body.

23. A method as defined in claim 16 wherein said host material is an ore concentrate.

24. A method as defined in claim 16 wherein said host material is a matte material from a smelting process.

25. A method for recovering a precious metal from a host material having a precious metal constituent and a base metal constituent, comprising the steps of:
   subjecting said host material to a first oxidative pressure leach process in a sulfuric acid leach solution, with sufficient oxidant and at a selected temperature to recover substantially all of said base metal constituent in the form of at least one sulphate complex into a first leach solution; and then
   subjecting said host material to a second oxidative pressure leach process, in the presence of a chloride ion constituent which is reactive with said precious metal, and at a temperature ranging from 210 degrees Celsius to 230 degrees Celsius, sufficient to cause at least a portion of said precious metal to be recovered in a precious metal-bearing chloride complex into a second leach solution; and then
   recovering said precious metal from said complex.

26. A method as defined in claim 25 wherein the first oxidative pressure leach process occurs at a temperature ranging from 100 to 190 degrees Celsius.

27. A method as defined in claim 25 wherein the first oxidative pressure leach process occurs at a temperature ranging from 120 to 170 degrees Celsius.

28. A method as defined in claim 21 wherein the first oxidative pressure leach process occurs at a temperature ranging from 130 to 150 degrees Celsius.

29. A method for recovering a precious metal from a host material, wherein said host material includes a precious metal and a base metal, comprising the steps of:

subjecting said host material to a single oxidative pressure leach process using a sulphuric acid leach solution, in the presence of a chloride salt, and at a temperature ranging from about 210 degrees Celsius to 230 degrees Celsius to cause substantially all of the base metal to form a base metal-bearing sulphate complex and the precious metal to form a precious metal-bearing chloride complex; and recovering said precious metal from the chloride complex.

30. A method for recovering a precious metal from a smelt matte material, wherein said matte material includes a precious metal constituent and a base metal constituent, comprising the steps of:

subjecting said matte material to a single oxidative pressure leach process, in the presence of a halide ion constituent which is reactive with said precious metal constituent, and at a temperature sufficient to cause substantially all of said base and precious metal constituents to be recovered into a first leach solution; and recovering said precious metal from said leach solution, wherein the halide ion constituent is a chloride.

31. A method for recovering a precious metal and a base metal from a common host material, comprising the steps of:

subjecting the host material to a single oxidative pressure leach process with a sulphuric acid leach solution, in the presence of a chloride ion constituent which is reactive with said precious metal constituent, the leach solution having at least 1 g/L acid, and at a temperature from about 210 to about 230 degrees Celsius to cause at least a portion of said base metal to form a sulphate complex and the precious metal to form a chloride complex; and recovering said base metal from the sulphate complex and said precious metal from the chloride complex.

32. A method for recovering a precious metal portion and a base metal portion from a host material, comprising the steps of:

subjecting said host material to an oxidative pressure leach process with a sulphuric acid leach solution, in the presence of a chloride ion constituent at a temperature of at least 200 degrees Celsius in order to form a leach solution containing at least one precious metal-bearing chloride complex and a base metal-bearing sulphate complex; and recovering said precious metal from said chloride complex.

33. A method for recovering a precious metal portion and a base metal portion from a host material, comprising the steps of:

leaching said host material under oxidative pressure conditions with a sulphuric acid leach solution and in the presence of a chloride salt selected from the group consisting of sodium chloride, calcium chloride, potassium chloride, ferrous chloride, ferric chloride, cupric chloride, cuprous chloride, lithium chloride and magnesium chloride, at a temperature ranging from about 210 degrees Celsius to about 230 degrees Celsius in order to form a leach solution containing at least one precious metal-bearing chloride complex and a base metal-bearing sulphate complex; and recovering said precious metal from said chloride complex.

34. A method for recovering a precious metal from a host material, comprising the steps of:

depositing said host material in an autoclave, exposing the host material to a sulphuric acid leach solution containing a chloride salt providing a chloride ion constituent which is reactive with said precious metal, at a temperature ranging from about 210 degrees Celsius to about 230 degrees Celsius, and under pressure conditions sufficient to cause at least a portion of said precious metal to be extracted by a leach solution, thereby to form a precious metal-bearing chloride complex dissolved in the leach solution while in said autoclave; and thereafter recovering said precious metal from said chloride complex.

35. A method for recovering a precious metal from a host material, comprising the steps of:

subjecting said host material to an oxidative pressure leach process with a sulphuric acid leach solution, in the presence of a chloride salt providing a chloride ion constituent which is reactive with said precious metal, and at a temperature ranging from about 210 degrees Celsius to about 230 degrees Celsius to cause oxidation of sulfide and elemental sulfur present in the host materials to at least one sulfate group and at least a portion of said precious metal to be extracted by a leach solution to form a precious metal-bearing halide complex in the leach solution; and recovering said precious metal from said complex.

36. A method for recovering a platinum group metal from a host material, comprising the steps of:

subjecting said host material to an oxidative pressure leach process, in the presence of a chloride salt providing a chloride ion constituent which is reactive with said metal, and at a temperature ranging from about 210 to about 230 degrees Celsius, in a sulphuric acid leach solution with an acid strength of at least 1 g/L, to form a platinum group metal-bearing chloride complex in the leach solution; and recovering said metal from said chloride complex.

37. A method as defined in claim 36 wherein said host material is an oxidation catalyst.

38. A method for recovering a precious metal from a host material, comprising the steps of:

depositing the host material in an autoclave, exposing the host material to an oxidative pressure leach using a sulphuric acid leach solution;

providing chloride salt in the autoclave to recover the precious metal by forming a precious metal-bearing chloride complex which is dissolved in the leach solution while in said autoclave; and thereafter;

recovering the precious metal from said chloride complex.

39. A method for recovering a precious metal and a base metal from a host material, comprising the steps of:

depositing the host material in an autoclave, exposing the host material to an oxidative pressure leach using a sulphuric acid leach solution;

providing chloride salt in the autoclave to recover the precious metal by forming a precious metal-bearing chloride complex which is dissolved in the leach solution while in said autoclave and while forming at least one base metal-bearing sulphate complex;

recovering the precious metal from said chloride complex; and recovering the base metal from said sulphate complex.

40. A method for recovering a platinum group metal and a base metal from a host material, comprising the steps of:

depositing the host material in an autoclave, exposing the host material to an oxidative pressure leach using a sulphuric acid leach solution;

providing chloride salt in the autoclave to recover the platinum group metal by forming a platinum group metal-bearing chloride complex which is dissolved in the leach solution while in said autoclave and while forming at least one base metal-bearing sulphate complex;

recovering the platinum group metal from said chloride complex; and recovering the base metal from said sulphate complex.

41. A method for recovering a platinum group metal and a base metal from a host material, comprising the steps of:

depositing the host material in an autoclave, exposing the host material to an oxidative pressure leach using a sulphuric acid leach solution;

providing chloride salt in the autoclave to recover the platinum group metal by forming a platinum metal-bearing chloride complex which is dissolved in the leach solution while in said autoclave; and thereafter;

recovering the platinum group metal from said chloride complex.

* * * * *

UNITED STATES PATENT AND TRADEMARK OFFICE
CERTIFICATE OF CORRECTION

PATENT NO. : 6,315,812 B1
DATED : November 13, 2001
INVENTOR(S) : Christopher A. Fleming, David Dreisinger and P. Terry O'Kane It is certified that error appears in the above-identified patent and that said Letters Patent is hereby corrected as shown below:

<u>Title page,</u>
Item [63], No Claim for Priority is made to U.S. Patent Application Serial No. 09/299,714 or U.S. Patent Application Serial No. 09/298,337.

Signed and Sealed this

Twenty-first Day of January, 2003

JAMES E. ROGAN
*Director of the United States Patent and Trademark Office*